(12) United States Patent
Vennström et al.

(10) Patent No.: US 9,829,973 B2
(45) Date of Patent: Nov. 28, 2017

(54) EYE GAZE DETERMINATION

(71) Applicant: Tobii AB, Danderyd (SE)

(72) Inventors: Anders Vennström, Stockholm (SE); Mårten Skogö, Danderyd (SE); John Elvesjö, Stockholm (SE)

(73) Assignee: Tobii AB, Danderyd (SE)

( * ) Notice: Subject to any disclaimer, the term of this patent is extended or adjusted under 35 U.S.C. 154(b) by 96 days.

(21) Appl. No.: 14/580,286

(22) Filed: Dec. 23, 2014

(65) Prior Publication Data

US 2015/0177833 A1 Jun. 25, 2015

(30) Foreign Application Priority Data

Dec. 23, 2013 (GB) .................................. 1322873.9

(51) Int. Cl.
*G06F 3/01* (2006.01)
*G06F 3/0484* (2013.01)
*G06T 7/73* (2017.01)

(52) U.S. Cl.
CPC .......... *G06F 3/013* (2013.01); *G06F 3/04842* (2013.01); *G06T 7/73* (2017.01); *G06T 2207/10016* (2013.01); *G06T 2207/10048* (2013.01); *G06T 2207/20076* (2013.01); *G06T 2207/30201* (2013.01)

(58) Field of Classification Search
CPC .................. G06F 3/013; G06F 3/04842; G06T 2207/10016; G06T 2207/10048; G06T 2207/20076; G06T 2207/30201; G06T 7/0042
USPC ................................................ 345/156–173
See application file for complete search history.

(56) References Cited

U.S. PATENT DOCUMENTS

| | | | | |
|---|---|---|---|---|
| 6,104,384 | A * | 8/2000 | Moon ................ | G06F 3/04886 345/168 |
| 6,323,884 | B1* | 11/2001 | Bird .................... | G06F 3/04812 715/810 |
| 2005/0243054 | A1* | 11/2005 | Beymer .............. | A61B 3/0033 345/156 |
| 2006/0253793 | A1* | 11/2006 | Zhai ................... | G06F 3/04883 715/773 |
| 2007/0040799 | A1* | 2/2007 | Singh .................. | G06F 3/013 345/156 |
| 2010/0036655 | A1* | 2/2010 | Cecil .................. | G06F 3/0237 704/10 |
| 2012/0105486 | A1* | 5/2012 | Lankford ............ | G06F 3/013 345/661 |
| 2013/0088457 | A1* | 4/2013 | Tu ..................... | G06F 3/04886 345/174 |
| 2014/0002341 | A1* | 1/2014 | Nister ................. | G06F 3/013 345/156 |
| 2015/0113454 | A1* | 4/2015 | McLaughlin ....... | G06F 3/013 715/765 |

* cited by examiner

*Primary Examiner* — Hong Zhou
(74) *Attorney, Agent, or Firm* — Kilpatrick Townsend & Stockton LLP

(57) ABSTRACT

There is provided methods, systems and computer program products for identifying an interaction element from one or more interaction elements present in a user interface, comprising: receiving gaze information from an eye tracking system; determining the likelihood that an interaction element is the subject of the gaze information from the eye tracking system; and identifying an interaction element from the one or more interaction elements based on said likelihood determination.

12 Claims, 14 Drawing Sheets

EYE GAZE DETERMINATION

CROSS-REFERENCE TO RELATED APPLICATIONS

This patent application claims priority to Application No. GB 1322873.9, filed Dec. 23, 2013.

TECHNICAL FIELD

Generally, embodiments of the invention relate to the technical field of interacting with a computer-controlled system by detecting and tracking eyes and gaze directions.

More specifically, different embodiments of the application relate to improved determination and/or analysis of the gaze position of a user interacting with a computer-controlled system using gaze-based functionality, and more accurate determination and/or analysis of one or more interaction elements based on the gaze position.

BACKGROUND

Well defined and working human to computer interaction is important in daily life. However, there exists a need to further develop the interaction mediums as technology advances. One of the alternative input methods that is becoming more commonly used for interaction with computer-controlled systems is eye tracking and eye gaze determination. Eye gaze determination may be used for controlling a machine, e.g. a computer, through user interaction with a graphical user interface presented on a display connected or coupled to the machine. This input technique may be used in for example gaming, augmented reality, home computing etc. The input technique is also advantageously used to compensate for human limitations, e.g. compensate for physical limitations leading to difficulties in operating common input devices such as a key board; a buttons interface; or a touch interface, or to prevent injuries caused by repetitive motions performed when operating such input devices.

A system for eye tracking typically consists of a display, one or more light emitting diodes (LEDs), e.g. emitting infrared light that may be invisible to the human eye and therefore does not disturb the user, and a camera directed towards the head or face of a user, the camera and LEDs often being placed in connection with the display. The one or more LED light beams are reflected in each of the user eyes and create small reflection, also referred to as glints, in the eyes of the user. The small reflections can be identified and tracked in an image captured by the camera, using image processing methods known in the art. Furthermore, the position and shape of the pupils may be calculated using image processing methods known in the art. Furthermore, iris and other eye features may be determined and calculated. For examples of eye tracking methods we refer to the documents cited in the section related art. In order to determine the distance between the eye of the user and the gaze position, or the position on the display onto which the user's eyes are directed, using methods known in the art, at least one camera and one LED, or at least two cameras and one LED are needed. The determined gaze position is used to determine how the user intends to look at and/or interact with the user interface presented on the display.

Some eye tracking systems require calibration to improve functionality with a specific user that is going to operate the machine. This calibration may comprise determining a model of the eye, comprising the optical and physical properties of the eyes, which needs to be determined because the optical and physical properties of an eye varies between people and also between the eyes of a person. Estimation of optical and physical properties is needed in order to enable correct eye gaze determination using images captured by the camera, in order to track the eye gaze efficiently.

One problem in eye tracking is that even if the user believes that he/she is looking straight at a position on the display, the eye ball may be performing micro movements, or micro saccades, known to a person skilled in the art. Furthermore, the eyes of the user may drift from the intended position, which introduces measurement noise in the captured images. Another problem is offset error remaining after calibration, thereby resulting in errors in eye tracking calculations. A further problem may arise when the user is wearing eye-glasses, as this increases the amount of measurement noise in the captured images and introduces other errors due to reflections, refractions and the like.

Determination of the gaze position is thereby complicated, leading to consecutively measured gaze positions being scattered and not precise enough to e.g. determine a correct gaze position or gaze representative area on the display. When there are multiple objects or areas upon a display at which a user may be gazing, given an eye tracking system where accuracy is not absolutely correct in 100% of cases, there exists a need to find means for determining at which element a user is gazing.

There is a need for an improved determination and/or analysis of the gaze position of a user interacting with a computer-controlled system using gaze-based functionality.

RELATED ART

Examples of related art are found in the following documents:

The patent document U.S. Pat. No. 4,836,670 discloses an early system and method for eye movement detection and determination of where the eye is gazing.

The patent document U.S. Pat. No. 7,572,008 B2 discloses a method and installation for detecting and following an eye and the gaze direction thereof, wherein only a portion of a captured image is utilized by an eye tracking system.

The patent document U.S. Pat. No. 6,204,828 B1 discloses a computer-controlled system that aids operator positioning of a cursor by integrating eye gaze and manual operator input.

Published patent application US 2002/0171690 and patent document U.S. Pat. No. 5,808,601 both discuss weighting objects upon a screen in order to influence the location of a pointer, in a traditional non-eye tracking based computing system.

However, none of the related art discloses the solutions presented by embodiments of the present invention.

SUMMARY

Embodiments of the application relate to improved determination and/or analysis of the gaze position of a user interacting with a computer-controlled system using gaze-based functionality, and more accurate determination and/or analysis of one or more interaction elements based on the gaze position.

The term interaction element, as used herein, is defined in the introduction of the detailed description below.

An effect achieved through embodiments of the invention is determination of a measured gaze point or position that is as close as possible to the actual gaze point, i.e. the coordinate on the display device where the user is actually looking, thereby providing more accurate determination of one or more interaction elements based on the gaze position. The term display device as used herein may refer to a screen, a head-mounted display, a head-up display, eye glasses or other type of display configured to display a projection onto a suitable surface.

Another advantage, achieved through embodiments of the invention, is that a probability is determined, for one or more interaction elements, that the gaze of the user is directed onto the respective interaction element. The probability information may be used for selection of an interaction element, identification of one or more interaction elements or analysis of the gaze pattern of one or more users. For example, information may be gathered for a period of time and used for statistical analysis, such as determining the likelihood that a user will direct its gaze towards a certain interaction element. This likelihood information may be applied in calculations of weights for the respective interaction elements, according to embodiments described herein.

Some embodiments of the invention provide improved determination of a target interaction element that a user of the system intends to look at and/or interact with, using identification rules.

A problem with prior art solutions is that the determined measured gaze points are not the same as the actual gaze point. This problem is partly caused by optical and physical properties of the eyes of the user. Physical properties of the eye that lead to noise may for example be drifting, micro saccades and tremor of the eye, known to a person skilled in the art. Another related problem can be that the effect of eye glasses or contact lenses is not compensated for, and hence that the glint being reflected in the eye is not correctly calculated. An erroneously calculated model of the eye, the model including the optical and physical properties of the eye, or wrongfully estimated position of the glint, position of the pupil and/or relation between the position of the glint and the pupil of the user's eye because of reflections from eye glasses or contact lenses instead of the actual eye, causes incorrect determination of the measured gaze point.

Problems caused by physical properties of the human eye, psychological properties of the user and/or interference introduced by eye glasses, contact lenses or other sources of interference are solved or at least minimized by embodiments presented herein.

Problems may also be caused by the eye tracking equipment such as the camera, wherein problems may arise with accuracy and repeatability.

Problems with correctly determining the measured gaze point may arise when a number of consecutive measured gaze points have a large spread or are not located in a way that makes it obvious to determine what the user intends to look at and possibly also interact with in a user interface (UI).

According to aspects of the invention, there are provided methods, systems, computer program products and non-transitory computer readable mediums for identifying, determining or selecting one or more interaction elements onto which the gaze of a user of the eye tracking system is directed, from a selection of one or more interaction elements presented in a graphical user interface, wherein the above identified problems are solved or at least minimized. Identification of one or more interaction elements may be followed by determination of the likelihood that a user's gaze is directed at the respective interaction element. This likelihood information may in embodiments be used to aggregate information on how the system is used and update the likelihood calculations; analyse the behavior of the system; analyse the behavior of the user; select one or more interaction elements for activation such as initiating a specific function, highlighting of parts or all of the displayed UI, giving user feedback according to any known method, or performing a behind the scenes action that is not perceptible to the user; or perform any other function of the system. In embodiments, the selection or identification is based on an identification rule.

According to an aspect of the invention, there is provided a method for identifying an interaction element from one or more interaction elements present in a user interface, said method comprising: receiving gaze information from an eye tracking system; determining the likelihood that an interaction element is the subject of the gaze information from the eye tracking system; and identifying an interaction element from the one or more interaction elements based on said likelihood determination.

In embodiments, the method further comprises identifying an interaction element from the one or more interaction elements based on an identification rule. In an embodiment, the identification rule is based on information on properties of the one or more interaction elements. In an embodiment, the one or more interaction elements are assigned weights based on their properties, and the identification rule comprises identifying an interaction element based on the weights. In an embodiment, the identification rule is based on the distance from the determined eye gaze position to a selected coordinate, point or area of the one or more interaction elements presented in a user interface. In an embodiment, the identification rule is based on information on the physiological properties of the human eye.

According to another aspect of the invention, there is provided a system for identifying an interaction element from one or more interaction elements present in a user interface, said system comprising an eye tracking system; a user interface; and a processor, wherein the processor is configured to: receive gaze information from an eye tracking system; determine the likelihood that an interaction element is the subject of the gaze information from the eye tracking system; and identify an interaction element from the one or more interaction elements based on said likelihood determination.

In an embodiment, the processor is further configured to identify an interaction element from the one or more interaction elements based on an identification rule.

In an embodiment, the identification rule is based on information on properties of the one or more interaction elements. In an embodiment, the one or more interaction elements are assigned weights based on their properties, and the processor is configured to identify an interaction element based on the weights. In an embodiment, the identification rule is based on the distance from the determined eye gaze position to a selected coordinate, point or area of the one or more interaction elements presented in a user interface. In an embodiment, the identification rule is based on information on the physiological properties of the human eye.

According to another aspect of the invention, there is provided a computer program product comprising computer readable code configured to, when executed in a processor, perform any or all of the method steps or functions described herein.

According to another aspect of the invention, there is provided a non-transitory computer readable memory on which is stored computer readable code configured to, when executed in a processor, perform any or all of the method steps or functions described herein.

BRIEF DESCRIPTION OF DRAWINGS

Embodiments of the invention will now be described in more detail with reference to the appended drawings, wherein.

DETAILED DESCRIPTION

Introduction

Figure 1A:
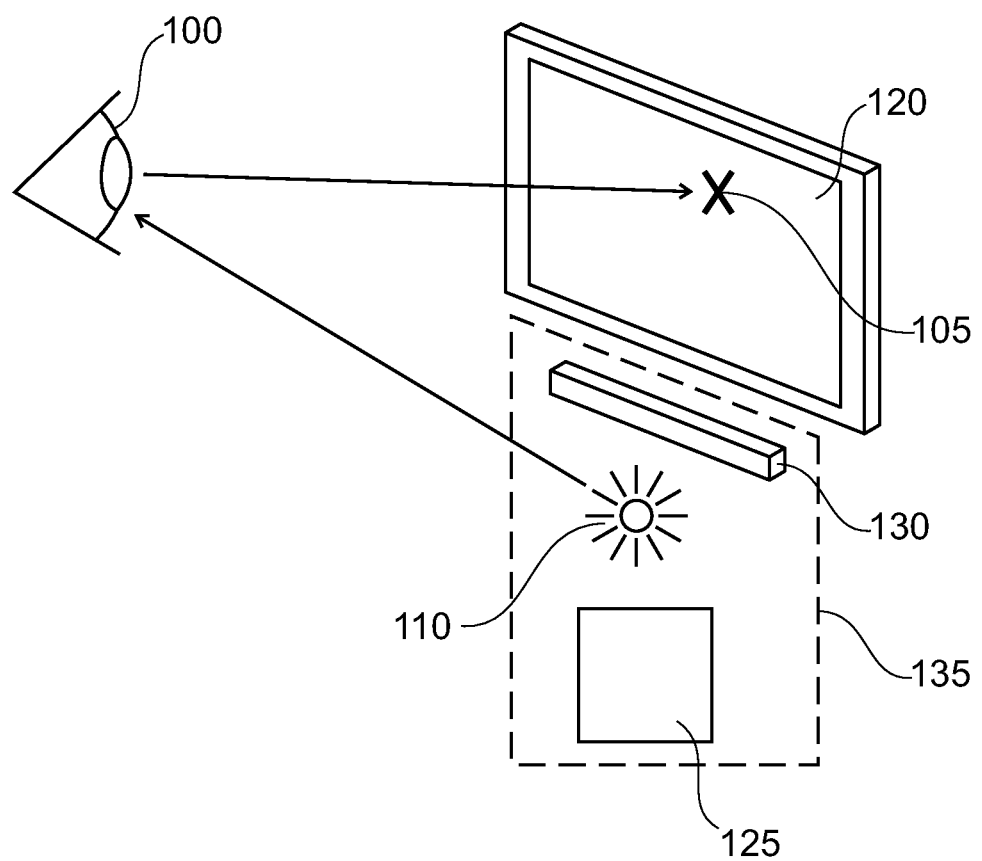
FIG. 1A shows a schematic view of a gaze-controlled computerized system.

The method and system embodiments presented herein provide improved determination and/or analysis of the gaze position of a user interacting with a computer-controlled system using eye tracking functionality, and further more accurate determination, selection, identification and/or analysis of one or more interaction elements based on the gaze position.

In an embodiment of the present invention it is desired that when the present invention is contained within a personal computer system, a display module displays at least one interaction element upon a visual display. An eye tracking system is provided capable of determining gaze information related to a user of the personal computer system. An identification module is provided within the personal computer system or eye tracking system, the module capable of determining an interaction element on the visual display that is the subject of gaze information from the eye tracking system.

Hereinafter, the term interaction element refers to any object or area in a UI that a user of the computer-controlled system may direct its gaze at. This includes not only elements in a UI that the user may directly interact with, and which interaction generates human perceptible feedback, but also elements that do not give any direct feedback to the user. For example, an element may be an image, a text area, the whole or any part of a UI (according to the broad definition of UI used herein) that the user directs its gaze to. According to embodiments presented herein, the system may in response to detecting that the user's gaze is directed at an element in the UI perform actions that generates feedback that the user is able to perceive, actions that generates feedback to the system, actions that generates feedback to a system developer, and/or gather information or calculate statistics related to the user gaze, user behavior or system behavior. This is further described in connection with the system of FIGS. 1C and 1D.

In some embodiments, there is achieved an improved determination of a target interaction element that a user of the system intends to look at and/or interact with, using identification rules based on the properties of the interaction elements and the physiological properties of the human eye. In some embodiments, a target interaction element is one of one or more interaction elements visually presented to the user in a graphical user interface on a display of the system. In other words, an effect achieved through some embodiments of the invention is determination of a measured gaze point or position that is as close as possible to the actual gaze point, i.e. the coordinate on the display where the user is actually looking, and providing more accurate determination of one or more interaction elements based on the gaze position.

The eye tracking may be performed according to any method known in the art. In other words, in embodiments presented herein, any known method may be used to establish the position of the eye or gaze in relation to a photo sensor, a display or a monitor.

Hereinafter, the term actual eye gaze position, which could also be referred to as actual gaze position, actual eye gaze point, or actual gaze point, refers to the position on a display onto which the user's eyes are directed. The estimation of the actual gaze position, as determined by an eye tracking system, is referred to herein as the measured, or determined, gaze position or gaze point.

Problems with correctly determining the measured gaze point may arise when a number of consecutive measured gaze points have a large spread or are not located in a way that makes it obvious to determine what the user intends to look at and possibly also interact with in a user interface (UI).

In embodiments, the UI is a graphical user interface (GUI). The UI may in other embodiments be a graphical representation on a display device such as a screen, a head-mounted display, a head-up display, eye glasses or other type of display configured to display a projection onto a suitable two dimensional (2D) or three dimensional (3D) surface, for example a windshield of a vehicle, a hand-held or body-worn augmented reality device, the see-through surface of a pair of eye glasses, or the like. In embodiments, the UI may be a 3D projection of a surface onto a real world scene, the 3D representation being calculated in any method known in the art. For example, if a room or other part of the real world has been mapped to a 3D surface representation, a user of a system, configured to control or analyze use of interaction elements, may look around in the real world surrounding him/her and interact with defined interaction elements through gaze interaction. The user may as an example look at a button of a coffee machine, whereby the coffee machine starts to make a cup of coffee. If the user is using or wearing any kind of display providing an augmented reality representation of the real world scene, an interaction element that the user is able to interact with, or an element that the user is looking at according to the improved measured gaze point calculated using any of the embodiments presented herein, may be highlighted or marked. The term display device as used herein may in other words refer to a screen, a head-mounted display, a head-up display, eye glasses or other type of display configured to display a projection onto a suitable surface.

Through embodiments of the invention there may be determined, for one or more interaction elements, a probability that the gaze of the user is directed onto the respective interaction element. The probability information may be used for selection of an interaction element, identification of one or more interaction elements or analysis of the gaze pattern of one or more users. For example, information may be gathered for a period of time and used for statistical analysis, such as determining the likelihood that a user will direct its gaze towards a certain interaction element. This likelihood information may be applied in calculations of weights for the respective interaction elements, according to in embodiments described herein.

One aspect that may be taken into consideration when determining a measured gaze point; determining, selecting or identifying an interaction element; determining probabilities of the user gazing at one or more interaction element; or analyzing the gaze pattern of one or more users, etc., is the properties of the one or more interaction elements. Such properties may comprise a selection of the following: interaction element type; intended use; visual context; interaction context; and/or collected data indicating that the user often interacts with the interaction element. The type of interaction element may comprise a selection of: an image, a surface, area or object in an image or in a real world scene, a soft button, a scroll area, an input field, a menu item or any other part of a UI.

Some embodiments of the invention provide improved determination of a target interaction element that a user of the system intends to look at and/or interact with, using identification rules based on a selection of the following: the properties of one or more interaction elements; psychological properties of the user observing the interaction elements; statistics based on the user behavior; and/or the physiological properties of the human eye. Problems caused by the user's subconscious, psychological, behavior may be that the user's gaze is not completely fixed, even if the user intends to look at the same part of the display, but tends to wander from or around for example the interaction element of interest. The subconscious behavior also comprises that the user's mind takes in information from the area around the actual gaze point and in doing so causes the eye to rapidly move around the point where the user intends to look. The user's behavior is here controlled by the user's feelings and by what draws the user's attention.

Problems caused by physical and psychological properties of the human eye or interference introduced by eye glasses or contact lenses are solved by embodiments presented herein.

If the measured gaze point of the user is positioned between or partly overlapping two or more interaction elements this may cause the system to alternatingly select, determine or identify the two or more elements alternatingly, thereby causing a flickering selection, determination or identification behavior of the system. This flickering selection, determination or identification behavior in some embodiments may cause distraction or be annoying to the user of the system, as the interaction elements may for example be alternatingly highlighted or a cursor may jump between two or more interaction elements. Embodiments presented herein solve these problems through the use of more sophisticated determination logic/identification rules to determine, select or identify an interaction element that the user is looking at, or by providing feedback on the flickering behavior to a system developer that can use the information to improve the system performance.

Hereinafter, two or more measured consecutive gaze point may be referred to as a measurement distribution, for example having the shape of a "gaze point cloud", as shown in FIGS. 2A, 2B, 4 and 6. One problem related to such measurement distributions of gaze points is that the gaze points of the measurement distribution may be positioned between or partly overlapping one or more interaction elements in the GUI, causing uncertainty regarding which interaction element the user is looking at and/or intends to interact with.

According to aspects of the invention, there are provided methods, systems, computer program products and non-transitory computer readable mediums for identifying, determining or selecting one or more interaction elements onto which the gaze of a user of the computer-controlled system is directed, from a selection of one or more interaction elements presented in a graphical user interface, wherein the above identified problems are solved or at least minimized. Identification, determination or selection of one or more interaction elements may be followed by determination of the likelihood that a user's gaze is directed at the respective interaction element. This likelihood information may in embodiments be used to aggregate information on how the system is used and update the likelihood calculations; analyse the behavior of the system; analyse the behavior of the user; select one or more interaction elements for activation such as initiating a specific function, highlighting of parts or all of the displayed UI, giving user feedback according to any known method, or performing a behind the scenes action that is not perceptible to the user; or perform any other function of the system. In embodiments, the selection, determination or identification is based on an identification rule.

A system as described in connection with FIGS. 1C and 1D may be considered to have at least two types of user. The first type is a person viewing, interacting with or controlling the system using gaze based interaction. This type of user is referred to as simply a "user" hereinafter. A second type of user is a person creating the user interface, retrieving information for analysis of user (the first type of user) behavior and/or updating the user interface based on gathered information. Hereinafter, this type of user is collectively referred to as a "system developer".

System Architecture

Figure 1B:
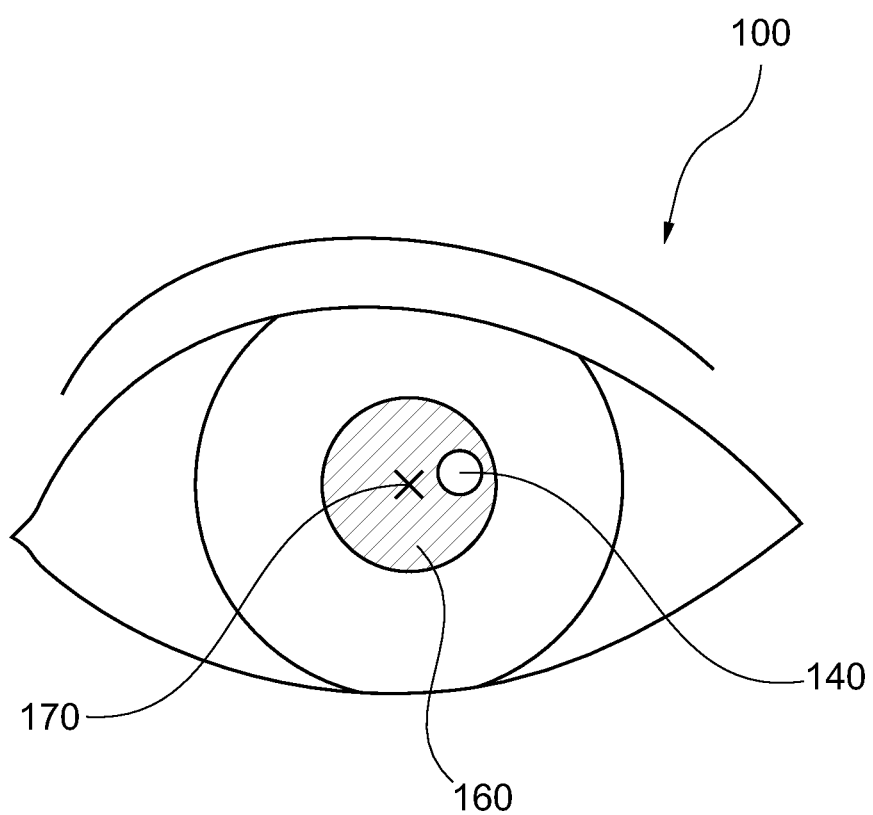
FIG. 1B shows an example of an eye with a reflected glint or small reflection.

FIG. 1a shows a schematic overview of a system, according to an embodiment, for determining a point on a display 120 at which a user/operator is looking/gazing. The embodiment of FIG. 1A is used for the purpose as illustration only, any system capable of estimating a position upon a 2D or 3D surface at which a user is gazing, is suitable for use with the present invention. FIG. 1b illustrates the eye of the user/operator looking at the display 120 of FIG. 1a. FIG. 1c shows a schematic overview of a computerized system 1 that may according to embodiments be controlled by the user/operator through gaze interaction.

In FIG. 1a, the gaze of a user's eye 100 is directed towards a surface 120 in the form of a 2D or 3D surface that may for example be the display surface of a display device, as illustrated in the example of FIG. 1a, a surface comprising a projection of real world scene, or a part of an actual real world scene. The point or coordinate on the surface where the user is actually looking is herein referred to as the actual gaze point 105. One or more imaging devices 130 are directed towards the head or face of the user and are configured to capture an image comprising the user's eye/eyes 100. In some embodiments, there are two or more imaging devices 130. In embodiments there is provided one or more light sources 110, these may be located adjacent to or spaced apart from the one or more imaging devices 130. In embodiments, the one or more light sources no and the one or more imaging device 130 are parts of an eye tracking system 135. In some embodiments, the one or more light sources 110 and the one or more imaging devices 130 are co-located, for example integrated in a common housing. These co-located units may be located for example below or above the display device 120. According to some embodiments, the eye tracking system 135 comprises two or more of said light source 110. The light sources may be light emitting diodes (LEDs), and according to embodiments these may be infrared light emitting diodes (IR LEDs). The one or more light sources 110 are configured to emit light (e.g. IR light) and positioned within the eye tracking system 135 such that the emitted light is reflected from the user's eye 100. The reflection in the user's eye may hereinafter be referred to as a small reflection or a glint. In the close-up illustration of the user's eye 100 in FIG. 1b a small reflection, or glint, 140 is shown. As is evident to a person of normal skill in the art the number of glints 140 reflected in the user's eye 100 may be more than one, and depends on the number of light sources 110 used in the system where each light source gives rise to one glint 140. The reflected light/glint 140 will be visible as a bright spot in an image captured by the one or more imaging devices 130.

In embodiments, the eye tracking system 135 comprises an eye tracking processor 125 that is configured to process images captured by one or more imaging devices 130. The image processing may in embodiments comprise detecting a glint 140 in the captured image; and/or detecting the pupil 160 or the center 170 of a pupil 160 of a user's eye 100 in the captured image. The processor 125 may further be configured to use information on the image coordinates of a detected glint 140, pupil 160 and/or center of pupil 170 to determine the position on the display onto which the user's eyes are directed, also referred to as the gaze position or gaze point. The processor 125 may in embodiments be configured to perform detection of the glint 140, the pupil 160 and/or the center of the pupil 170 for every image captured by the imaging devices 130 and further to use the information on the image coordinates of a detected glint 140, pupil 160 and/or center of pupil 170 to track the gaze position and thereby the movements of the user's eyes across the display device 120. The eye tracking processor 125 may be integrated in, connected to or communicatively coupled to the eye tracking system 135, or may be integrated in an external computing device configured to receive and process information from the eye tracking system 135. In embodiments, the eye tracking processor 125 is a part of, or implemented in, the processing device 150 and thereby part of the system 1 described further in connection with FIG. 1C. In alternative embodiments, an eye tracking system may be provided which operates without discrete light sources 110 and operates using only ambient or pre-existing lighting. Such a system may utilize a pre-existing imaging device such as a web camera or similar. The present invention does not relate to any specific eye tracking system and will be recognized as such by a person of normal skill in the art. It is intended that any system capable of estimating a position upon a 2D or 3D surface at which a user is gazing, is suitable for use with the present invention.

Figure 1C:
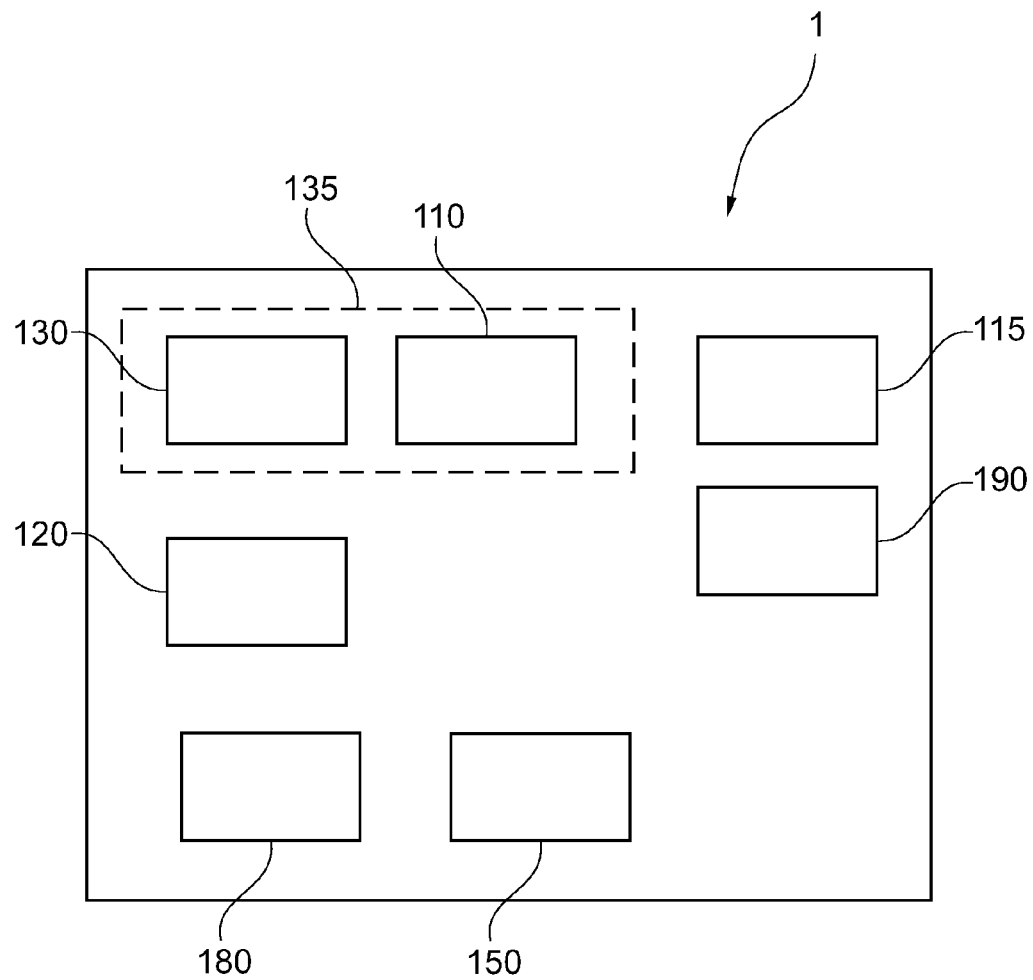
FIG. 1C shows a schematic view of a system according to embodiments of the invention.
Figure 1D:
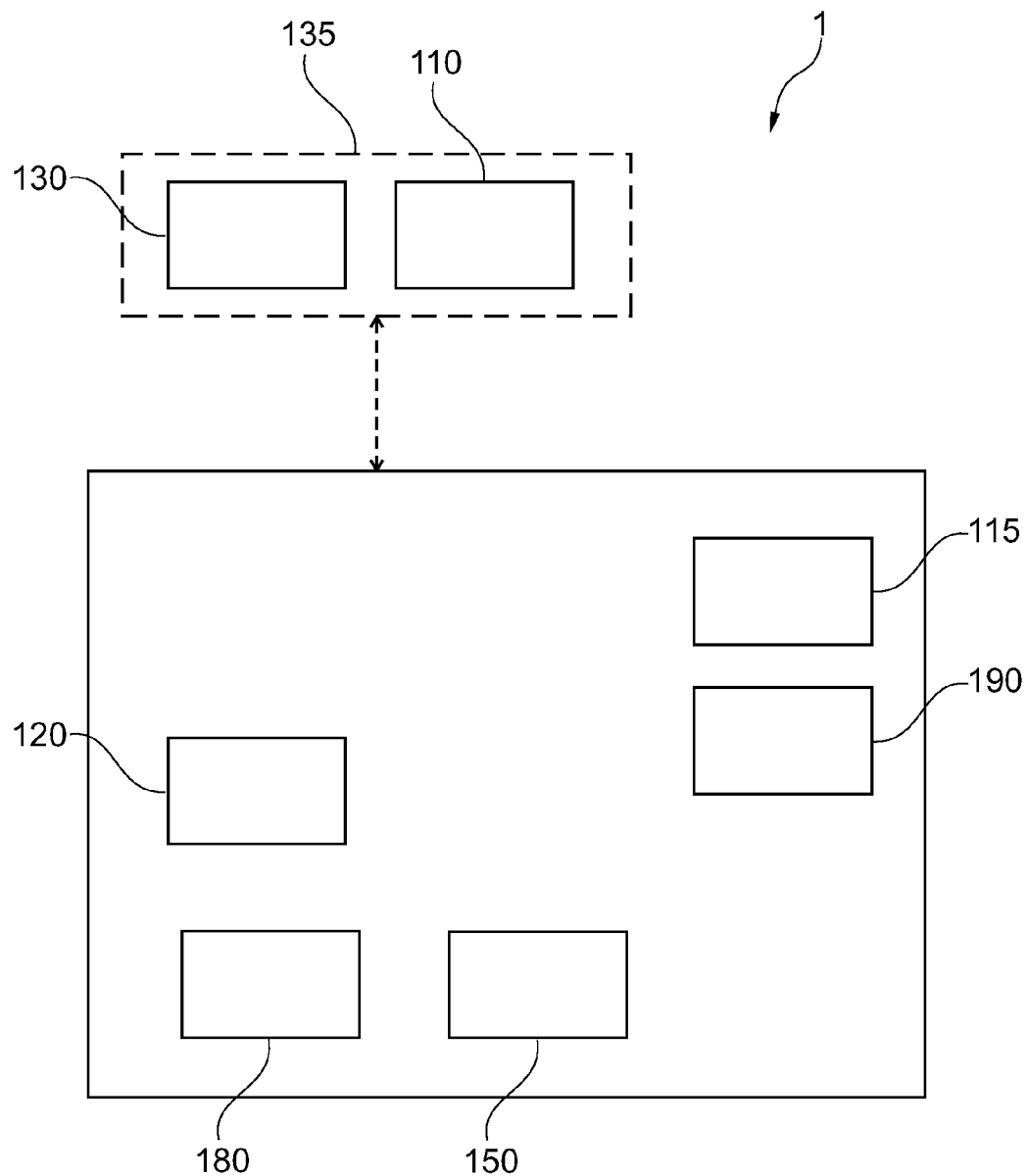
FIG. 1D shows a schematic view of a system according to embodiments of the invention.

As shown in FIG. 1c, the system 1 further comprises a processing device, or processor, 150 that is connected to or communicatively coupled to the one or more imaging devices 130 and the display device 120.

In embodiments, the system 1 further comprises at least one memory 115 integrated in, connected to or communicatively coupled to the system 1.

In embodiments, the system 1 comprises one or more input device 180 integrated in, connected to or communicatively coupled to the system 1. The one or more input devices 180 may be mechanically activated and are configured to generate an input signal in response to a user interacting with the input device 180. An input device 180 may e.g. be a keyboard, a joystick, a computer mouse, an isometric pointing transducer, a trackball, a microphone, a gesture control system, face recognition, a touch screen or touch pad or the like. According to embodiments, the user may for example use gaze control to identify an interaction element or area of a UI and use an input device to indicate that the identified interaction element should be selected or activated. In some embodiments, the processor 150 is configured to receive an input signal from an input device 180 indicating that an interaction element should be selected or activated, and to select or activate the interaction element that is currently identified as the one the user is looking at in response to the received input signal.

The system 1 further comprises a graphical user interface (GUI) 190 configured to present on the display 120 graphical representations of interaction elements, such as buttons, scroll areas, menus, images, surfaces, or other objects or areas that a user of the system may look at, select or identify. Thereby, the user is enabled to control or interact with the system, through active or passive interaction. Interaction elements in the GUI may in embodiments include only interaction elements that the user may actively interact with; only elements that the user may not actively interact with; or a combination of the two types. Determination, selection or identification of interaction elements that the user may actively interact with are in embodiments configured to trigger direct feedback to the user in response to selection or identification of the respective interaction element. For example, a button that is identified as the one the user is looking at may be highlighted or selected/activated; or the UI may provide feedback in the form of graphics, sound or light, or a specific action may be performed by the system, in response to identification, determination or selection of an interaction element. Interaction that does not lead to direct feedback may include the system performing an action without providing feedback perceptible by the user, gathering of information on the behavior of the system, the behavior of the user, updating of likelihood information that the user will look at different parts of the UI, or other information collection for future calculation, performance improvements and/or analysis. In some embodiments, it is relevant to known whether a user is looking at an interaction element/part of a UI or not, without taking any further action related to the element/part of the UI. In embodiments, the processor 150 is configured to analyse the user gaze position in relation to the one or more interaction elements present in the UI. In an embodiment, the processor 150 is configured to determine whether a user is looking at a specific interaction element or not. In embodiments, the processor 150 is configured to do a selection of the following: perform an action without providing feedback perceptible by the user; gather information on the behavior of the system; gather information on the behavior of the user; calculating and/or updating the likelihood that the user will look at different parts of the UI; collect information for future calculations and/or analysis; analyse and/or improve the performance of the system 1; and/or calculate statistics related to the user gaze, the user behavior and/or the system behavior. In embodiments, the processor 150 is configured to determine, select or identify an interaction element, from one or more interaction elements presented in the GUI, based on the determined gaze position of the user, thereby enabling user control of the computerized system through gaze interaction. In embodiments, the processor 150 is configured to determine, select or identify an interaction element, from one or more interaction elements presented in the GUI, based on an identification rule. Identification rule embodiments are further described in connection with the figures below. The selected interaction element may according to embodiments e.g. be highlighted in the GUI, or an action connected to the interaction element may be performed in the system, depending on the settings of the system and possibly also on additional manual input provided received from an input devices 180, in response to a user providing the manual input by using the input device 180.

Method Embodiments

Figure 2A:
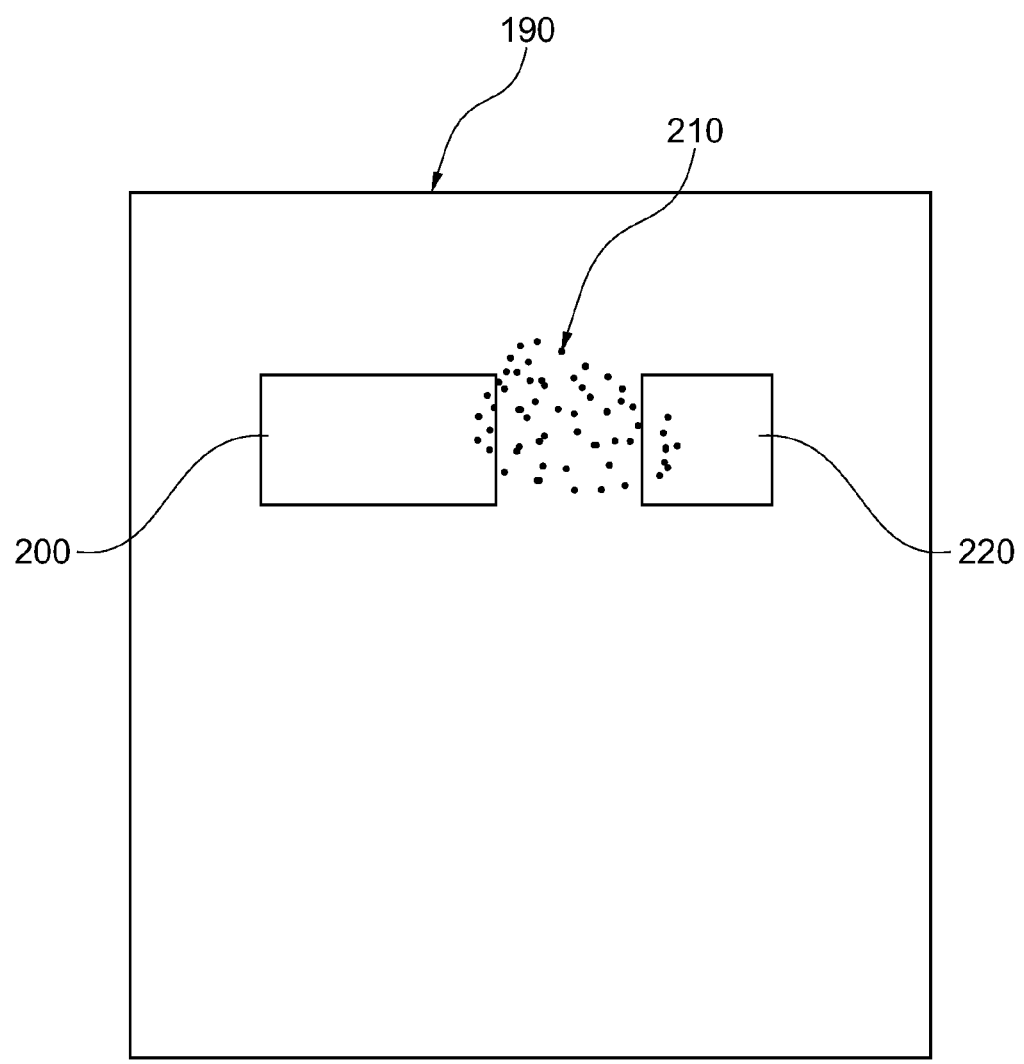
FIGS. 2A and 2B illustrate measured gaze positions in a graphical user interface, measured at a number of time instances.
Figure 2B:
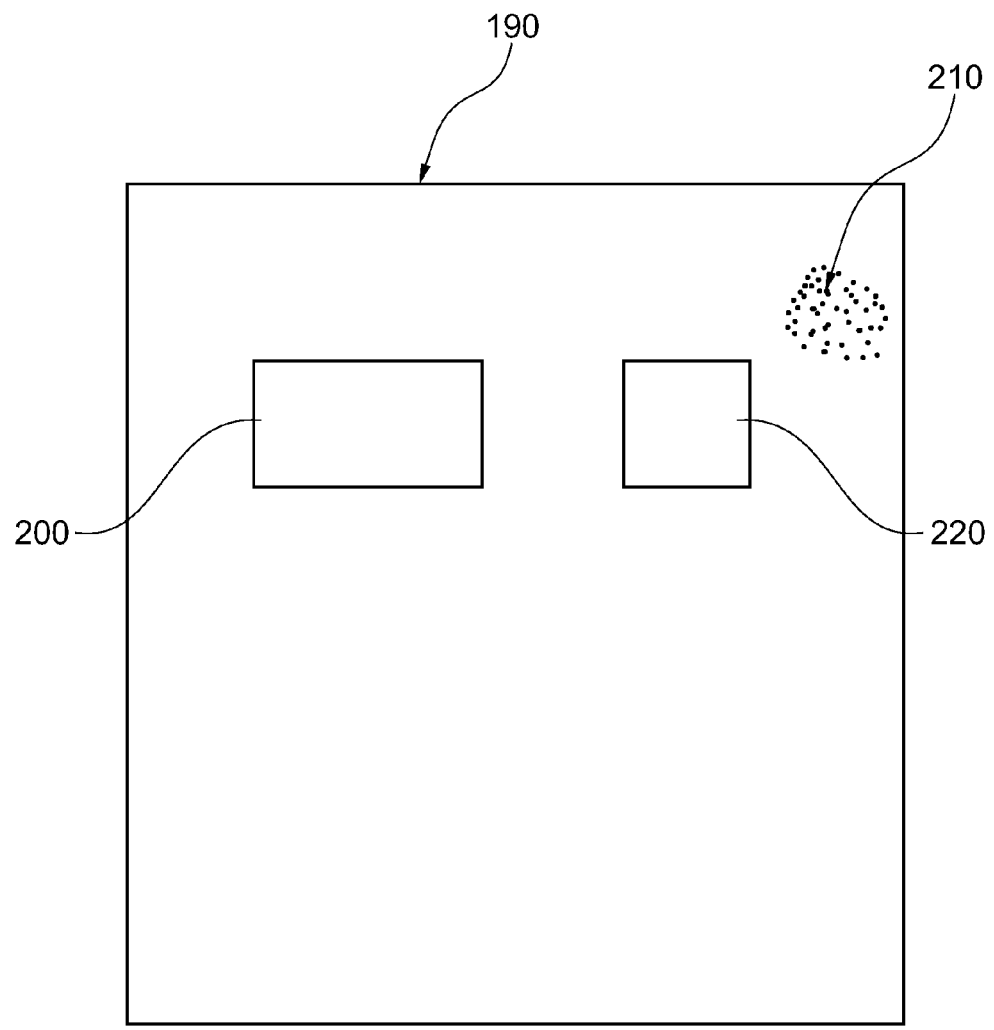
Figure 4:
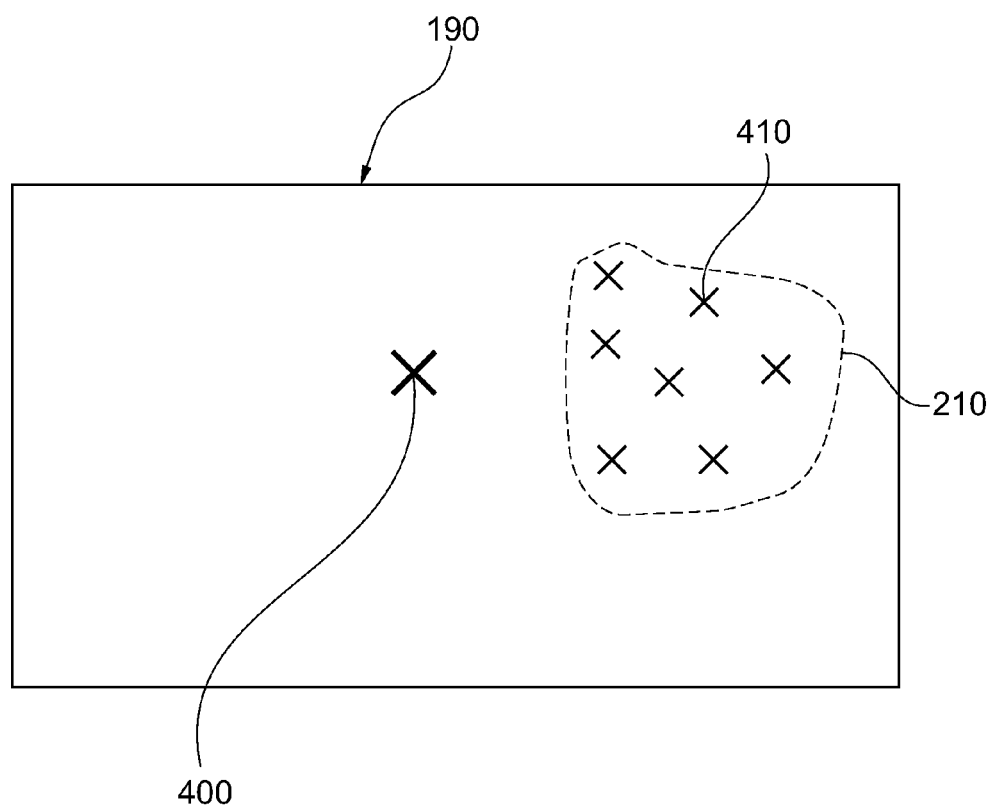
FIG. 4 shows a GUI comprising a visual representation of a distribution comprising a number of measured, or calculated, gaze positions.

FIG. 2A shows a GUI 190 comprising two interaction elements 200, 220 and a measurement distribution 210, wherein the measurement distribution comprises a number of measured gaze positions on the display 120, illustrated as points in the distribution 210 in FIGS. 2a and 2b. FIG. 4 shows a GUI comprising a visual representation of a distribution consisting of a number of measured, or calculated, gaze positions. More specifically, in FIG. 4 a measurement distribution 210 comprising a number of measured, or calculated, gaze positions 410 are shown, along with an actual gaze position 400, in other words the point or position in a GUI 190 that the user is actually looking at. The GUI 190 can of course comprise any suitable number of interaction elements.

As can be seen from FIG. 4, the actual gaze position 400 is not within the borders of the measured gaze distribution 210. This is caused by an offset between the actual gaze position 400 and the measured gaze position 410. Embodiments herein alleviate the effects of the offset error.

Furthermore, the distribution of the measured gaze points 410 within the measurement distribution 210 is caused by noise introduced in the images by the system and/or due to physiological properties of the eye. System noise may be introduced from the detector or other parts of the optics of the imaging device 130. Physical properties of the eye that lead to noise may for example be drifting, micro saccades and tremor of the eye, known to a person skilled in the art.

The measurement distribution of gaze points 210 in FIG. 2A is positioned partly on and between the two interaction elements 200, 220. Some method embodiments for selecting, determining or identifying one interaction element from two or more interaction elements 200, 220 in GUI 190, when the measured gaze points of the distribution 210 are not all positioned on an interaction element but positioned partly on and between the two or more interaction elements, comprise calculating all measured gaze position and/or the area in which all the measured gaze positions reside. The method embodiments may further comprise selecting, determining or identifying the interaction element that has within the borders of the element, or within the borders of a defined selection area: the largest amount of overlapping measured gaze positions, or the largest area that coincides with the area in which all the measured gaze positions reside. A selection area in the context of the invention is an area defined for a specific interaction element, wherein the selection area at least partly overlaps the area of the interaction element. Typically, the selection area coincides with or comprises the area of the interaction element. The size of the selection area depends on the weighting of the interaction element, based on the properties of the interaction element, the interaction context, the psychological properties of the user and the physiological properties of the human eye, as discussed herein. The interaction context relates to how an interaction element is used by the user in the current context. The current context may in this case be that the user is looking/searching for something in the UI, navigating in the UI, wants to activate a certain function, wants to read, pan or scroll, or the like. For example, if it is known that the user wants to select or activate an interaction element, by the user providing manual input indicating this, through statistics based assumption or the like, any selectable interaction elements may for instance be assigned higher weights or highlighted in the UI so that it is easier for the user to select them. Other interaction elements, such as scroll areas, text areas or images, may in this context be assigned lower weights or inactivated. In another example, if the user is reading a text, panning or scrolling, again known from user input, through statistics based assumption or the like, any selectable interaction elements may be assigned low weights or inactivated, and/or any highlights may be removed, so that the user is not distracted.

If the gaze of the user is measured or determined to be directed at a point within the defined selection area, the interaction element that is connected to the selection area is selected, identified or determined, according to embodiments herein. In embodiments, the processor 150 is configured to calculating all measured gaze position and/or the area in which all the measured gaze positions reside. In embodiments, the processor 150 is further configured to select, determine or identify an interaction element that has within the borders of the element, or within the borders of the defined selection area: the largest amount of overlapping measured gaze positions, or the largest area that coincides with the area in which all the measured gaze positions reside. Due to the possible offset between the actual gaze point and the measured gaze points the use of this method alone may in some cases lead to determination of the wrong interaction element. The method may advantageously be combined with other method embodiments herein to provide further improved results.

FIG. 2B shows a GUI 190 comprising two interaction elements 200, 220 and a measured gaze point distribution 210. The gaze points of the measurement distribution 190 are not positioned on either one of the interaction elements 200, 220, which once again leads to problems with determining an interaction element that the user intends to look at and/or interact with.

Figure 3A:
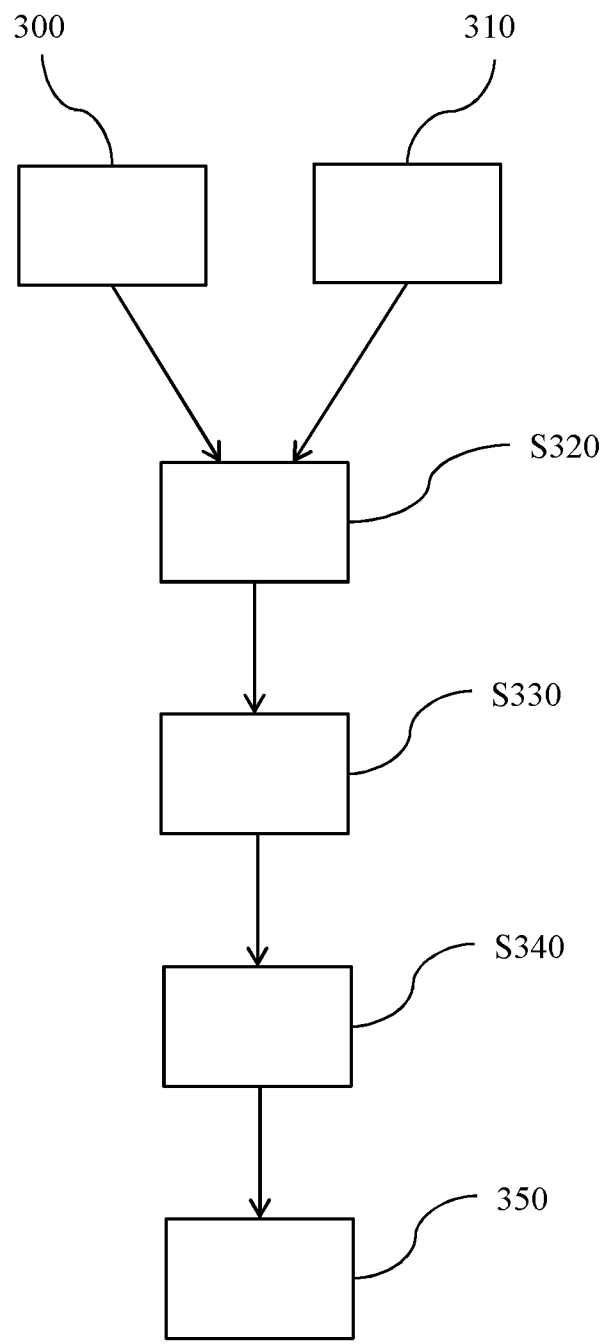
FIG. 3A-3C show flow diagrams of method embodiments.

In an aspect of the invention, shown in FIG. 3A, there is provided a method for identifying an interaction element from one or more interaction elements present in a user interface, said identification comprising:

In step S320: receiving gaze information from an eye tracking system.

In step S330: determining the likelihood that an interaction element is the subject of the gaze information from the eye tracking system.

In embodiments, the likelihood that an interaction element is the subject of the gaze information from the eye tracking system is determined for one or more interaction elements in a set 300 of one or more interaction elements present in a UI. In embodiments, the likelihood that an interaction element is the subject of the gaze information from the eye tracking system is based on whether the respective interaction element or a selection area or weighted area or volume, as further described herein, comprises a point, coordinate or area onto which the gaze of a user of the eye tracking system is directed.

In step S340: identifying an interaction element from the one or more interaction elements based on said likelihood determination.

In embodiment, the identification is done using an eye tracking system. After the identification of step S340, a result 350 is obtained that comprises at least one of the following: one or more selected or identified interaction elements, information on where the user is looking as feedback to the system or a system developer, likelihood information on where the user is looking for one or more of the interaction elements of the set 300 or any other type of information for future analysis or improvement of the system performance or analysis of the system behavior or the user behavior.

In embodiments, the identification of step S340 comprises identifying an interaction element from the one or more interaction elements based on an identification rule 310.

In an embodiment, the identification rule 310 is based on information on properties of the one or more interaction elements. In an embodiment, the one or more interaction elements are assigned weights based on their properties, and the identification rule 310 comprises identifying an interaction element based on the weights.

The likelihood information, or weighting information, may be applied to the UI by use of an alpha mask. The alpha mask then represents the weight landscape of the UI and the interaction elements comprised in the UI. An alpha mask may be preset, retrieved from the memory 115, calculated in real time during operation of the system 1 or applied by a system developer via an API.

In an embodiment, the identification rule 310 is based on the distance from the determined eye gaze position to a selected coordinate, point or area of the one or more interaction elements presented in a user interface. In an embodiment, the identification rule 310 is based on information on the physiological properties of the human eye.

In an embodiment, the processor 150 is configured to receive gaze information from an eye tracking system; determine the likelihood that an interaction element is the subject of the gaze information from the eye tracking system; and identify an interaction element from the one or more interaction elements based on said likelihood determination.

In an embodiment, the processor 150 is further configured to identify an interaction element from the one or more interaction elements of the set 300 based on an identification rule 310.

In an embodiment, the identification rule 310 is based on information on properties of the one or more interaction elements. In an embodiment, the one or more interaction elements are assigned weights based on their properties, and the processor 150 is configured to identify an interaction element based on the weights. In an embodiment, the identification rule 310 is based on the distance from the determined eye gaze position to a selected coordinate, point or area of the one or more interaction elements presented in the UI. In an embodiment, the identification rule 310 is based on information on the physiological properties of the human eye.

In an embodiment, the identification rule 310 comprises information on properties of the one or more interaction elements. Such properties may for example include the type of interaction element, possible types including an image, a surface, an area or an object in an image or in a real world scene, a soft button, a scroll area, an input field, a menu item and any other relevant interaction element types as described herein and/or known to a person skilled in the art. The element properties may in embodiments comprise information on the likelihood that a user will determine the interaction element. The likelihood information may be preset via an application programming interface (API) based on input from the system developer that has created the GUI. Likelihood information regarding interaction elements may also be input at a later time by a system developer using said API. In another embodiment, likelihood information may be based on statistics on which interaction element or elements the user selects to look at and/or actively interact with. For example, parts of the UI that comprises high contrasts, face parts or other things that are likely to draw the users attention may be assigned high weights. In embodiments, an interaction element that has a high likelihood to be selected by the user of the system, based on its properties, for example comprising a selection of: intended use; visual context; interaction context; and/or collected data indicating that the user often interacts with the interaction element, will be assigned a high weighting value. This is also referred to as personalized weighting of the interaction elements. The statistics information either being calculated/aggregated for the current session during operation of the system 1, or retrieved from the memory 115. In embodiments, the memory 115 is configured to receive data representing interaction element properties, and to store such data for later retrieval.

Information on where in the GUI interaction elements are located, and/or the size of the interaction elements, may be preset by a system developer at the distributor of the GUI, or input by a system developer using the system 1 at a later time, via an API, for example during operation of the system 1 or as a separate process based on input from one or more sessions of a user interacting with the system 1. In embodiments, the memory 115, or another memory unit connected or coupled to the system 1 may comprise information on any or all of the interaction element related properties described herein. In embodiments, the information comprised in the memory 115, or other memory unit, is accessible to the system developer and/or the system 1 via a UI, such as an API. The processor 150 may in embodiments be configured to retrieve information on interaction element related properties from the API and to use the interaction element related information in the identification step S340 in combination with the identification rule 310 to identify an interaction element as the result 350. For example, interaction element related properties may comprise information on how the interaction element is intended to be used (just to be looked at, selection, activation of a function etc.) and what the user intends to achieve by looking at and/or interacting with the interaction element (close window, open window, expand menu, scroll page etc.). For example, a button marked "OK" may be assigned a high weighting if it is likely that the user will want to confirm a previous choice or the like by activating the button. Interaction element related properties may in embodiments be context related, as described herein, which may in turn generate a higher weighting value for interaction elements that are important according in the specific context.

In an embodiment, the one or more interaction elements are assigned weights based on their properties, as further described in connection with FIGS. 5A-C and 6, and the identification rule 310 comprises selecting one of the one or more interaction elements based on the weights. In an embodiment, the identification rule 310 comprises, for each time instance, information on the distance from the detected or measured gaze position to the interaction elements presented in the graphical user interface. In these embodiments, every time a gaze position is determined or measured, the distance from the determined or measured gaze position to the interaction elements presented in the graphical user interface is determined, and the processor 150 is configured to determine the distances from the eye gaze position to each of the one or more interaction elements. The distance may be determined to the center of the interaction element, the nearest coordinate or point, or any other selected coordinate or point according to the settings of the system 1.

In an embodiment, the identification rule 310 comprises information on the physiological properties of the human eye, as described herein and/or psychological properties of the user, such as the user's tendency to be distracted by visual information in the UI.

In an embodiment, the processor 150 is configured to determine the distance from the center or any other selected point or coordinate of at least one interaction element to a measured gaze point, and to identify or select the interaction element based on the determined at least one distance. The processor 150 may be in this embodiment be configured to select or identify the interaction element having the shortest determined distance to the measured gaze point.

In embodiments, if the user's gaze is measured at positions within the borders of a selection area representing selection, identification or determination of an interaction element in a UI, the interaction element connected to the selection area is selected. In embodiments, if the user's gaze lingers for a predetermined period of time, or a predetermined number of measured gaze points, at positions within the borders of a selection area representing selection or determination of an interaction element in a graphical user interface, the interaction element connected to the selection area is selected or determined. The processor 150 may be configured to determine when the user's gaze lingers for a predetermined period of time, or a predetermined number of measured gaze points, at positions within the borders of a selection area representing selection or determination of an interaction element in a graphical user interface, and when the predetermined period of time, or predetermined number of measured gaze points, is exceeded select or identify the interaction element connected to the selection area. According to embodiments, a solution for determining when to swap from selection or determination of a first interaction element to selection or determination of a second interaction element is to determine a number of times in a row, or an amount of time, that the measured gaze points are located on or within a determined distance from the second interaction element.

Figure 5A:
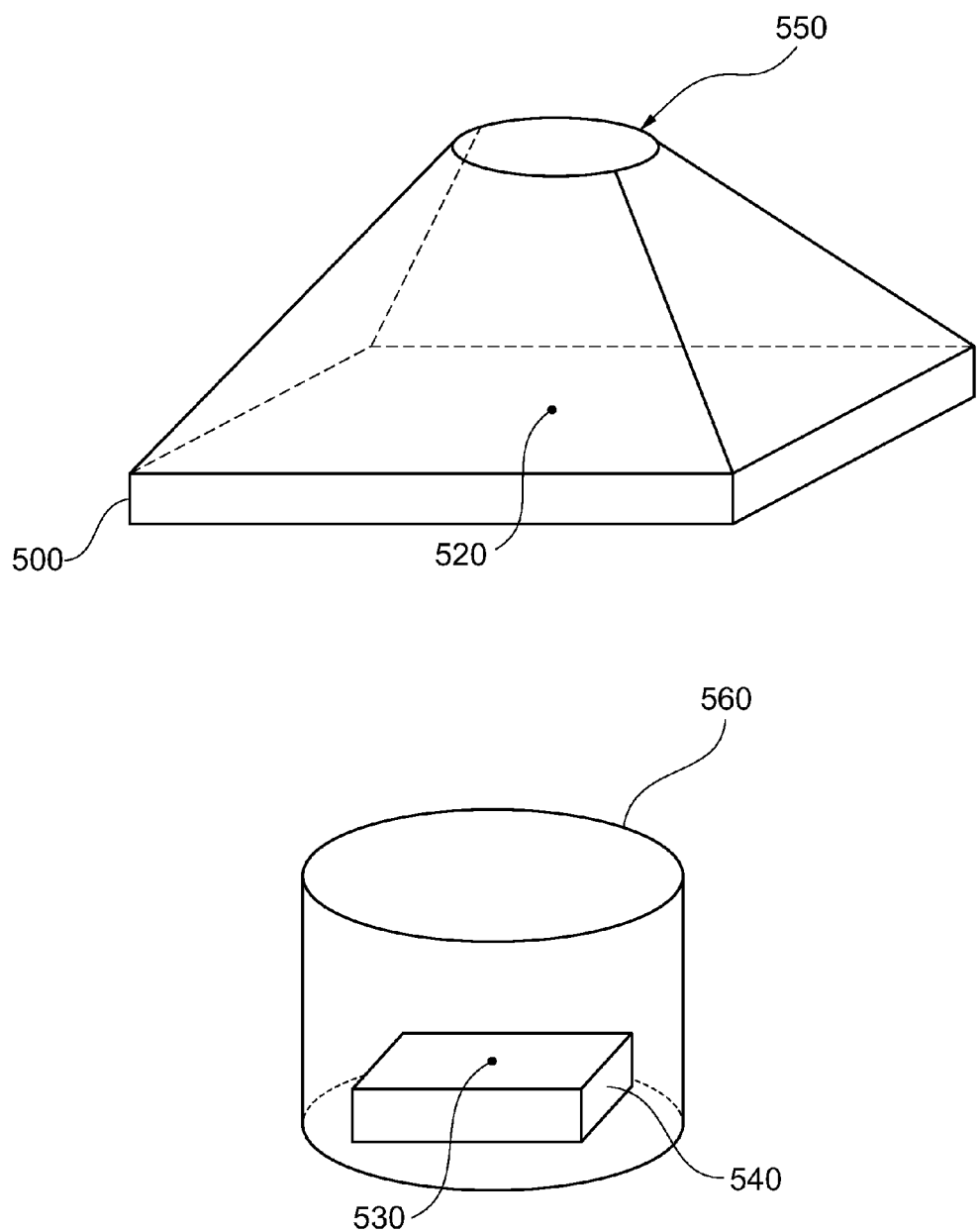
FIGS. 5A and 5B illustrates how weights may be assigned to interaction elements, according to method embodiments.

In FIG. 5A, two interaction elements 500, 540 are shown. In the figure, the interaction elements 500, 540 are shown as 3D objects to illustrate how weights are according to embodiments assigned to the interaction elements before determination of an interaction element is performed. In FIG. 5A, weighted volumes 550, 560, are assigned to the respective interaction elements 500, 540, based on their properties. For example, FIG. 5A illustrates two buttons graphically represented in a 2D GUI to a user interacting with a gaze controlled computerized system. In FIG. 5A, the buttons represented as 3D objects, having the same (x,y) coordinates and size that they have in the 2D GUI representation, but also having an extension along the z axis of the coordinate system shown in FIG. 5A. The extension in the z direction, or "height" of the interaction element, represents the weight assigned to the different parts of the interaction elements 500, 540. As can be seen for the interaction element 500, the highest weight is assigned to the (x,y) coordinates around the center point 520, as this is the point that the user is most likely to direct its gaze to. From the center and out to the edges of the interaction element 500, the weight is reduced, creating a weighted volume 550. For the interaction element 540, on the other hand, the weight is constant for the entire interaction element and parts of the area surrounding the interaction element, represented by a cylindrical weight volume 560. The reason is that the interaction element 540 is so small that if the user gazes near to the interaction element, it is very likely that the user intends to look at and/or interact with the interaction element. Furthermore, The interaction element 540 of the figure also appears to have a high likelihood of being of interest to the user, based on its properties or the previous behavior of the user as discussed herein, since the weighted volume 560, based on the interaction element 540, has a greater "height" in the z direction then the weighted volume 550, based on the interaction element 500. The example interaction element 540 of the figure has both a weighted volume with a base that is bigger than the area of the interaction element itself, due to its small size, and is considered likely to be looked at by a user, giving it a great "height". Of course, these things do not have to coincide. Some interaction element types may in embodiments be assigned weights that only separates them from the remaining non-interactive parts of the GUI. For example, a scroll area may be assigned a constant weight, for all (x,y) coordinates comprised in the scroll area, that is higher than the weight of the non-scrollable area surrounding it. For another interaction element, for example a button or a menu item, the same may be true, or a weight may be assigned based on more complex calculations, based on properties of the interaction element such as the size of the element, the likelihood that a user will want to look at it and/or interact with it, the distance from the center or any other selected part of the interaction element, as described in connection with FIG. 5C, etc. The weighting may in embodiments include the use of a weighting function, as described in connection with FIG. 5B and/or determination of a selection area, as described in connection with FIG. 6. The shape and size of the selection area may in turn be based on weighting information for the respective interaction elements, such as objects and/or areas in the UI. In embodiments, the processor 150 may be configured to receive identification rule information, calculate weights for one or more interaction elements of the UI and/or assign weights to one or more interaction elements of the UI.

The implementation of weightings and the like will be understood by a person skilled in the art to be implemented mathematically in software. The illustrations provided in the figures showing 3D representations and the like are provided for visualization and explanation purposes only.

Figure 5B:
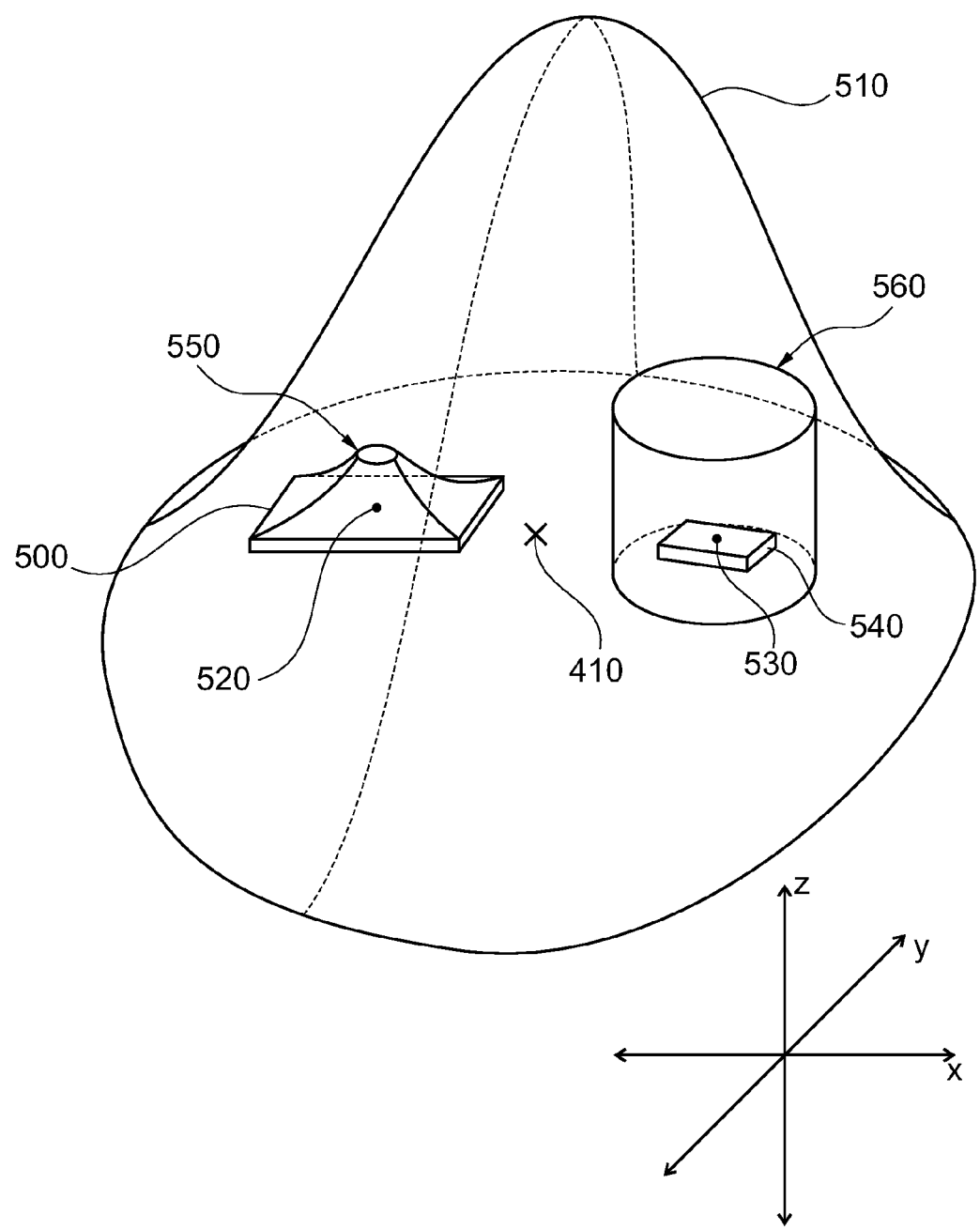

In some embodiments, the identification rule 310, used in the identification step S340, comprises weighting of the interaction elements 500, 540 based in their weighted volumes, as described in connection with FIG. 5A, and further based on their distance from the measured gaze point 410. The distance from the measured gaze point 410 is taken into consideration by use of a function that generates a 3D-surface centered around the (x,y) coordinate of the measured gaze point. This is illustrated by the exemplary surface 510 in FIG. 5B that is centered on a measured gaze point 410. As illustrated in FIG. 5B, the surface 510 has a base along the x axis and the y axes, corresponding to the x axis and y axis of the 2D visual representation of the GUI, or in other words the image presented to a user on a display device 120.

Calculation of weights is performed in a 3D space where a third axis, the z axis, has been added. The z axis value of each (x,y) coordinate corresponds to the weight assigned to the coordinate. In FIG. 5B the weighting 3D surface is a function that has the shape of a normal distribution, or Gauss distribution, in three dimensions. However, as is obvious to a person of ordinary skill in the art, any suitable distribution function or other mathematical function that can generate a 3D surface. The 3D surface may in embodiments be centered on the x,y coordinate of the measured gaze point 410 or any other selected point. In one embodiment, the processor 150 is configured to detect a movement of the user's gaze, predict a new gaze point and generate a 3D surface overlapping the predicted gaze point. In some embodiments, there is provided a distribution 210 of measured gaze points 410, whereby a 3D surface is generated, by means of a mathematical function, centered on the distribution 210 (not shown in FIG. 5B). The amounts of measured gaze points and specifically the size of the area that the distribution resides may influence the size and shape of the 3D surface. For example, if the measured gaze points 410 are positioned close to each other the base for the 3D surface may be smaller, and possibly more exact, than if the measured gaze points 410 are widely spread.

In embodiments, the identification rule used for selection or identification of an interaction element 220 comprises information on the distance from the center, or any other selected coordinate or point, of the interaction element and a measured gaze point. In some embodiments, the interaction element having the shortest distance from its center or the selected coordinate or point to the measured gaze point is selected or identified.

Figure 5C:
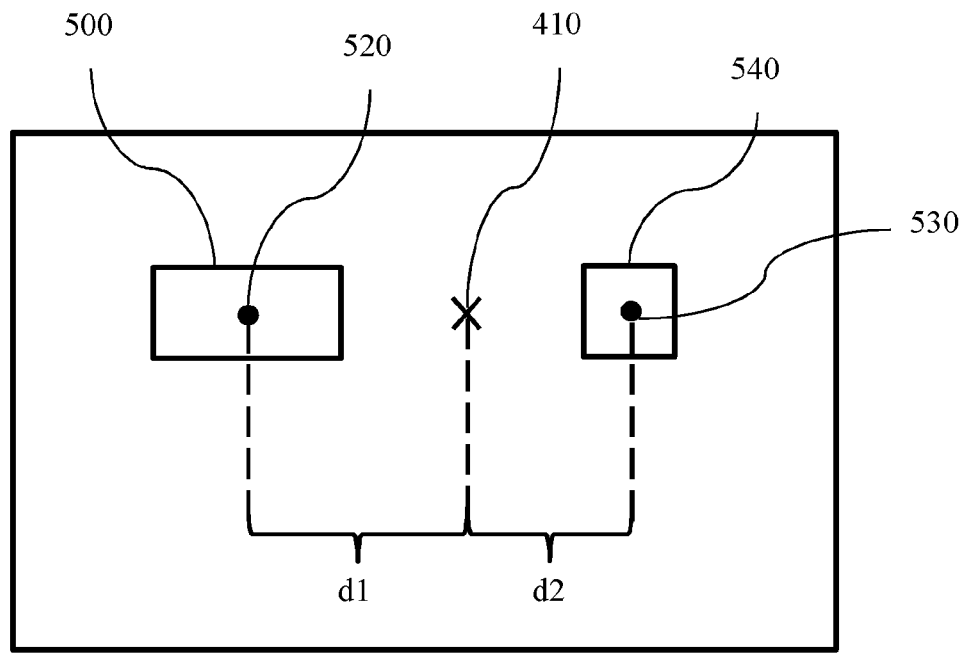
FIG. 5C illustrates method embodiments for calculating distances between interaction elements and a measured gaze point.

In other embodiments, the distance information is used to determine the likelihood that a user is looking at a certain respective interaction element, for a single interaction element, for a selection of the interaction elements of the UI or for all interaction elements of the UI. FIG. 5C shows two interaction elements 500, 540 having a respective selected point 520, 530. The measured gaze point 410 is at a certain time instance located between said interaction elements 500, 540. In embodiments illustrated in FIG. 5c, there is provided a method for determining which interaction element 500, 540 the user wants to select, the method comprising calculating the distance d1, d2 from the respective selected points 520, 530 to the measured gaze point 410; comparing the distance d1 to the distance d2; and selecting the interaction element 500 if d1<d2, or selecting the interaction element 540 if d1>d2, in other words selecting the interaction element that has the shorter distance d1, d2 from its selected point 520, 530 to the measured gaze point 410s. The figure illustrates measured distances d1, d2 at a single time instance. Of course, the identification rule may comprise that the distances are calculated based on several measured gaze points 410 in a measurement distribution 210 and compared for each time instance. By basing the determination on a plurality of compared distance pairs d1, d2, a more accurate determination of the interaction element that the user is interested in may be performed. The identification rule may according to such embodiments comprise for example that the distance d1 must be smaller than the distance d2 during a preset number of consecutive measurements, or for a preset amount of time.

Distance information as described in connection with FIG. 5C may be a part of the information on which the weighting of interaction elements/parts of the UI is assigned. In embodiments, the identification rule may comprise distance information in combination with any of the other weighting, selection or identification information presented in method embodiments herein. Through the combination, further improvement of the selection, determination, identification or analysis of interaction elements is achieved. Hence, any selection, determination or identification of interaction elements, or information gathering with the purpose of analyzing user behavior or improving system performance, for example, is improved.

Figure 3B:
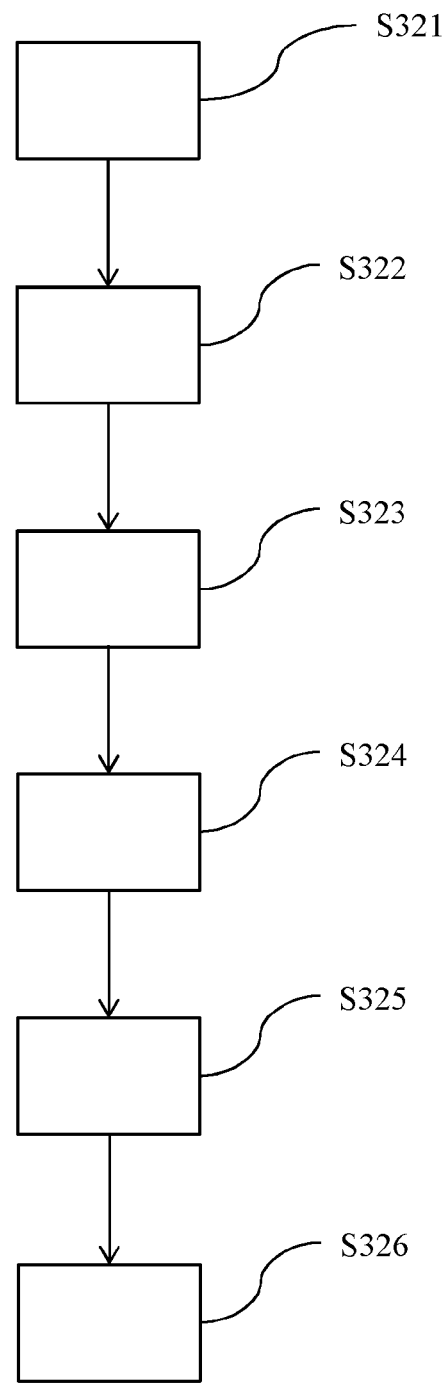

FIG. 3B shows a detailed method that in embodiments is part of the determination of likelihood and identification of an interaction element of method steps S330 and S340. In embodiments comprising weighting of all or a selection of the interaction elements present in the GUI, and the use of a weighting function to generate a 3D surface comprising one or more measured gaze points 410 or a predicted gaze point coordinate, the determination of method step S330 comprises:

For each interaction element:
In step S321: retrieve or calculate weight information for the interaction element, based on the properties of the interaction element.
Examples are presented in connection with FIG. 5A. The position and size of the interaction elements may be retrieved from a memory 115, provided via an API connected with the GUI, or be determined using image processing methods known in the art.
In step S322: retrieve or calculate weights for a selected area comprising one or more measured, calculated or predicted gaze points 410, based on a mathematical function.
The mathematical function may, when applied to a 3D space, be seen as a 3D surface having different weights/amplitude/height for the different (x,y) coordinates of the area under the surface. The mathematical function may be a distribution function, for example a normal distribution function or a Gauss function/Gauss bell, but any suitable mathematical function may be used. In embodiments, the mathematical function is retrieved from the memory 115 or provided via an API. In embodiments, the mathematical function is defined in the identification rule 310.
In step S323: select a subset of the 3D surface that comprises the (x,y) coordinates corresponding to the (x,y) coordinates of the area of the interaction element in the 2D representation.
In step S324: combine the z axis values of the selected subset of the 3D surface with the z axis values of the interaction element.
In embodiments, the combination comprises convolving the z axis values of the selected subset of the 3D surface with the z axis values of the interaction element.
According to embodiments, the convolution is continuous, whereby the convolution generates a resulting weighting value.
According to embodiments, the convolution is a discrete convolution performed for the discrete values of the z axis values or weighting values assigned to the corresponding (x,y) coordinates of the interaction element and the selected subset of the 3D surface, thereby generating a set of weighted values dependent on the weighted z axis values of both the selected subset of the 3D surface and the interaction element. The generated set of weighted values is then a discrete set of values, for example in the form of a vector.
In embodiments, the combination is based on discrete values of the z axis and comprises multiplication or addition of the values for each corresponding pair of (x,y) coordinates, or any other mathematical operation suitable for combining the weighting values of the interaction element with the weighting values of the selected subset of the 3D surface, thereby generating a set of weighted values dependent on the weighted z axis values of both the selected subset of the 3D surface and the interaction element.

If the combination of step S324 has already resulted in one resulting weighting value, for example from continuous convolution, step S325 is not performed. Otherwise, the method comprises:

In step S325: determine a resulting weighting value from the generated set of weighted values.

In an embodiment, the resulting weighting value is the sum of all values in the generated set of weighted values.

In an embodiment, the resulting weighting value is a mean or median value of all the values in the generated set of weighted values.

In an embodiment, the resulting weighting value is the maximum value among the values in the generated set of weighted values. In embodiments, the method step S340 further comprises:

In step S326: select one of the resulting weighting values, from the resulting weighting values of all interaction elements, and identifying or selecting the interaction element corresponding to the selected resulting weighting value.

In an embodiment, the highest of the resulting weighting values is selected. Thereby, the interaction element that has the highest resulting weighting value from all the interaction elements is identified or selected. Thereby, the interaction element comprising the highest combined weight value is selected or identified.

In other embodiments, the selection of step S326 is based on another preset criterion.

The interaction element may in some embodiments after selection or identification be highlighted in the GUI, or activated, or simply identified by the system 1. The information may be used for analysis or feedback to the system developer, as described herein.

In embodiments, the processor 150 is configured to:
for each interaction element:
  i retrieve or calculate weight information for the interaction element, based on the properties of the interaction element;
  ii retrieve or calculate weights for a selected area comprising one or more measured, calculated or predicted gaze points 410, based on a mathematical function;
  iii select a subset of the 3D surface that comprises the (x,y) coordinates corresponding to the (x,y) coordinates of the area of the interaction element in the 2D representation;
  iv combine the z axis values of the selected subset of the 3D surface with the z axis values of the interaction element; and
  if the combination of step iv results in a set of weighted values:
  v determine a resulting weighting value from the generated set of weighted values; and In embodiments, the processor 150 is further configured to select one of the resulting weighting values, from the resulting weighting values of all interaction elements, and identifying or selecting the interaction element corresponding to the selected resulting weighting value.

Figure 3C:
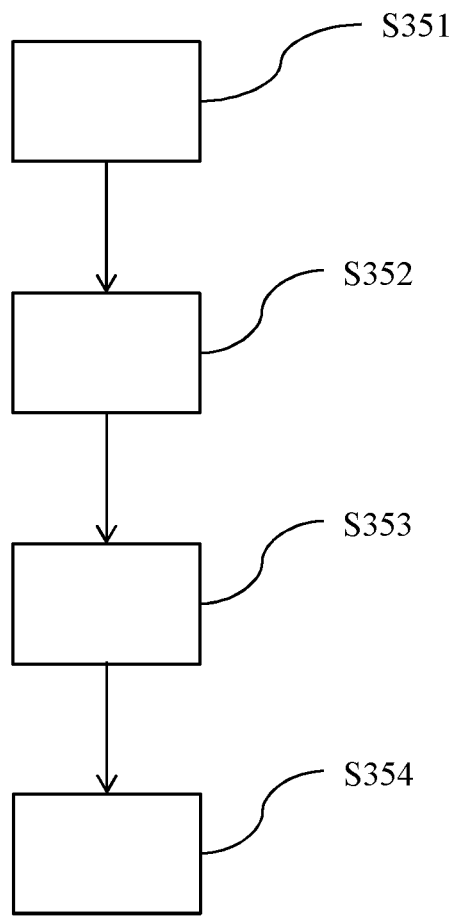

In some method embodiments, as illustrated in FIG. 3C, dynamic thresholding may be used to determine when to switch from identification of a first interaction element to identification of a second interaction element. This solves the problem of flickering behavior of the system in identification, and possibly selection or activation, of an interaction element, as a switch from one interaction element to another is based on aggregated information instead of momentaneous information. A flickering behavior of the system may in some embodiments also cause visual flickering in the GUI when different interaction elements are alternatingly highlighted or a cursor moves between different interaction elements. Dynamic thresholding may be used singly or in combination with any of the method embodiments described herein, for example as a part of the determination of likelihood and identification of an interaction element in the method steps S330 and S340. Dynamic thresholding may in this context comprise:

For a first and a second interaction elements, wherein the first interaction element was identified, and possibly also selected, at the previous time instance:

In step S351: determining a weight value for the first and the second interaction element.

The determination of a weight value may be performed according to any of the method embodiments including weighting described herein.

In step S352: determining the difference between the weight value for the first interaction element and the weight value for the second interaction element.

In step 353: comparing the difference between the weight value for the first interaction element and the weight value for the second interaction element to a threshold value.

In different embodiments, the threshold value is preset by a system developer, retrieved from the memory 115, or calculated in real-time based on a selection of: properties of the UI; properties of the interaction elements; psychological properties of the user; physiological properties of the human eye; detected noise; and/or offset.

If the second interaction element has a weight value that is larger than the weight value of the first interaction element, and the difference exceeds the threshold value, the method further comprises:

In step S354: selecting the second interaction element.

If the weight value of the second interaction element is higher than the weight value of the first interaction element, but the difference does not exceed the predetermined marginal/threshold value, the selection swap of step S354 is not made.

In some embodiments, the threshold value is adjusted based on detected noise, offset and/or the current weights before the next comparison is made. Thereafter, a new gaze point measurement is performed and the maximum weight values of the two or more interaction elements of the GUI is calculated. A new difference value is calculated, and if an interaction element that was not selected after the previous measurement has the highest maximum value, the difference is compared to the current threshold value. Each time the marginal/threshold value is exceeded, a swap in selection or determination of the interaction elements is made. In other words, the method of FIG. 3C may be performed iteratively.

In an embodiment, the processor 150 is configured to:
determine a weight value for the first and the second interaction element;
determine the difference between the weight value for the first interaction element and the weight value for the second interaction element;

compare the difference between the weight value for the first interaction element and the weight value for the second interaction element to a threshold value; and if the second interaction element has a weight value that is larger than the weight value of the first interaction element, and the difference exceeds the threshold value:

select the second interaction element.

Figure 6:
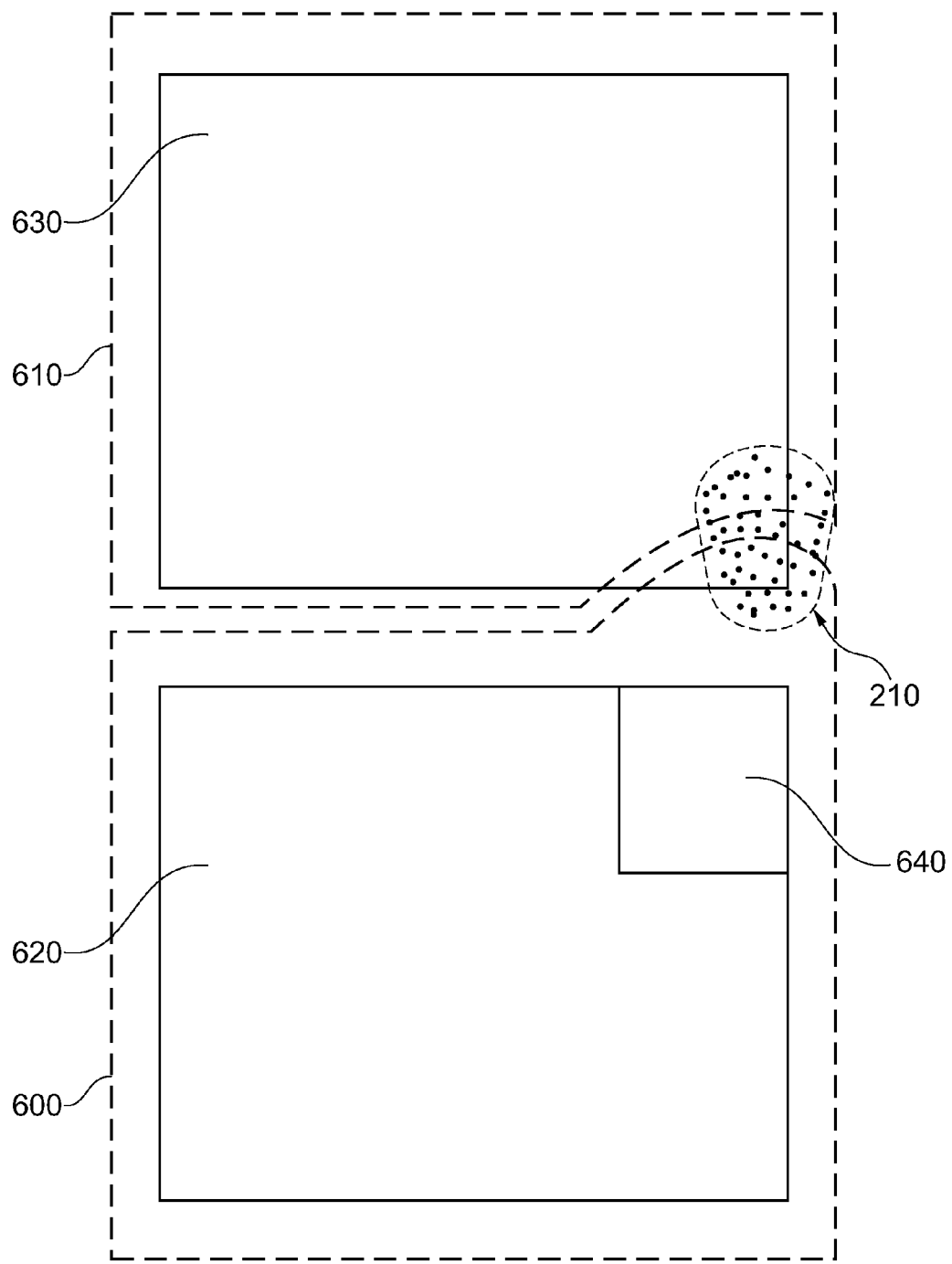
FIG. 6 illustrates method embodiments for assigning weight-based selection areas to interaction elements in a UI.

FIG. 6 illustrates an embodiment with a UI, here in the form of a GUI, comprising two interaction elements 620, 630, wherein the interaction element 620 is assigned a greater weight value compared to the weight value of interaction element 630. The higher weight is in the illustrated example based on the visually interesting area 640 that is likely to draw the observing user's attention. This leads to the selection area 600 partly overlapping the interaction element 630. Therefore, some of the measured gaze points within the distribution 210 that would appear to be directed at the interaction element 630 will according to the weighting be considered to be directed at the interaction element 620. A selection area, illustrated by dashed outlines 600, 610 in the figure, refers according to embodiments to an area comprising an interaction element with a weight value, wherein the interaction element is according to different embodiments selected, determined or identified if a measured gaze point is located within the selection area of the interaction element. As can be seen from the figure, selection area 600 comprises a larger number of gaze points from the measurement distribution 210 or a larger part of the measurement distribution 210, or is closer to a calculated center point or weighted center of the measurement distribution 210, compared to the selection area 610. In embodiments, this would result in the interaction element being selected or identified. In other embodiments, this information may be stored and possibly aggregated with previous information on the behavior of the user, contributing to improved calculations of the likelihood of the user looking at different parts of the presented UI in front of him/her. This resulting in measurement distribution 210 being displaced to interaction element 640, and said interaction element 640 being selected.

In embodiments, the memory 115 is configured to receive data representing identification rule logic, and to store such data for later retrieval.

In different embodiments, any calculations performed in the method steps of functions described herein may be performed In embodiments, the processor 150 is configured to perform any or all of the method steps or functions described herein.

Method embodiments presented herein solve the determination and/or analysis problem. As is evident to a person skilled in the art, method embodiments including different kinds of distance calculations, weighting and thresholding may be combined to achieve further improvements.

Further Embodiments

In an aspect of the invention, there is provided a computer program product comprising computer readable code configured to, when executed in a processor, perform any or all of the method steps or functions described herein.

In an aspect of the invention, there is provided a non-transitory computer readable memory on which is stored computer readable code configured to, when executed in a processor, perform any or all of the method steps or functions described herein.

What is claimed:

1. A computer system providing a gaze-controlled interface, the computer system comprising:

an operating system for executing an application;

a display module for displaying at least one interaction element on a visual display;

an eye tracking system operable to determine at least one gaze position of a user; and an identification module operable to determine an interaction element displayed on the visual display that is the subject of the gaze position;

wherein the identification module comprises a processor configured to determine an interaction element by:

assigning a first weighting to an interaction element based on at least one property of the interaction element;

determining a likelihood that the user will direct their gaze to the interaction element dependent on the gaze position by using an alpha mask representing a weight distribution of said interaction element;

assigning a second weighting to the interaction element dependent on the likelihood;

determining the distance from the determined gaze position to a selected coordinate or area within the interaction element, wherein the selected coordinate or area is a center of the interaction element; and identifying an interaction element dependent on the first weighting, the second weighting, and the determined distance from the determined gaze position to the selected coordinate or area.

2. The computer system according to claim 1, wherein the at least one property is selected from a group consisting of:

an intended use;

a visual context;

an interaction context; and collected data indicating how often one or more users interacts with the interaction element.

3. The computer system according to claim 1, wherein identifying the interaction element is further based on information on the physiological properties of an eye of the user.

4. The computer system according to claim 1, wherein identifying the interaction element comprises:

determining a weighting of a first and a second interaction element;

comparing the difference in the weighting between said first and second interaction elements with a threshold value; and selecting from said first and second interaction elements based at least in part on said comparison with said threshold value.

5. A computer program product comprising a non-transitory computer-readable medium with instructions for causing a programmable computer to at least:

execute an application;

display at least one interaction element on a visual display;

use an eye tracking system to determine at least one gaze position of a user; and determine an interaction element displayed on the visual display that is the subject of the gaze position by:

assigning a first weighting to an interaction element based on at least one property of the interaction element;

determining a likelihood that the user will direct their gaze to the interaction element dependent on the gaze position by using an alpha mask representing a weight distribution of said interaction element;

assigning a second weighting to the interaction element dependent on the likelihood;

determining the distance from the determined gaze position to a selected coordinate or area within the interaction element, wherein the selected coordinate or area is a center of the interaction element; and identifying an interaction element dependent on the first weighting, the second weighting, and the determined distance from the determined gaze position to the selected coordinate or area.

6. The computer program product according to claim 5, wherein the at least one property is selected from a group consisting of:

an intended use;

a visual context;

an interaction context; and collected data indicating how often one or more users interacts with the interaction element.

7. The computer program product according to claim 5, wherein identifying the interaction element is further based on information on the physiological properties of an eye of the user.

8. The computer program product according to claim 5, wherein identifying the interaction element comprises:

determining a weighting of a first and a second interaction element;

comparing the difference in the weighting between said first and second interaction elements with a threshold value; and selecting from said first and second interaction elements based at least in part on said comparison with said threshold value.

9. A method of providing a gaze-controlled interface, the method comprising:

executing an application;

displaying at least one interaction element on a visual display;

using an eye tracking system to determine at least one gaze position of a user; and determining an interaction element displayed on the visual display that is the subject of the gaze position by:

assigning a first weighting to an interaction element based on at least one property of the interaction element;

determining a likelihood that the user will direct their gaze to the interaction element dependent on the gaze position by using an alpha mask representing a weight distribution of said interaction element;

assigning a second weighting to the interaction element dependent on the likelihood;

determining the distance from a determined gaze position to a selected coordinate or area within the interaction element, wherein the selected coordinate or area is a center of the interaction element; and identifying an interaction element dependent on the first weighting, the second weighting, and the determined distance from the determined gaze position to the selected coordinate or area.

10. The method according to claim 9, wherein the at least one property is selected from a group consisting of:

an intended use;

a visual context;

an interaction context; and collected data indicating how often one or more users interacts with the interaction element.

11. The method according to claim 9, wherein identifying the interaction element is further based on information on the physiological properties of an eye of the user.

12. The method according to claim 9, wherein identifying the interaction element comprises:

determining a weighting of a first and a second interaction element;

comparing the difference in the weighting between said first and second interaction elements with a threshold value; and selecting from said first and second interaction elements based at least in part on said comparison with said threshold value.

* * * * *